(12) United States Patent
Kragelund et al.

(10) Patent No.: US 12,092,081 B2
(45) Date of Patent: Sep. 17, 2024

(54) ESTIMATING OF INERTIAL RESPONSE POWER OF A WIND TURBINE

(71) Applicant: Siemens Gamesa Renewable Energy A/S, Brande (DK)

(72) Inventors: Martin Nygaard Kragelund, Børkop (DK); Henrik Steffensen, Århus (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 131 days.

(21) Appl. No.: 17/440,352

(22) PCT Filed: Mar. 9, 2020

(86) PCT No.: PCT/EP2020/056190
§ 371 (c)(1),
(2) Date: Sep. 17, 2021

(87) PCT Pub. No.: WO2020/193111
PCT Pub. Date: Oct. 1, 2020

(65) Prior Publication Data
US 2022/0195985 A1 Jun. 23, 2022

(30) Foreign Application Priority Data
Mar. 22, 2019 (EP) .................................... 19164651

(51) Int. Cl.
*F03D 7/02* (2006.01)
*H02P 9/10* (2006.01)
*H02P 101/15* (2016.01)

(52) U.S. Cl.
CPC ........... *F03D 7/028* (2013.01); *F03D 7/0224* (2013.01); *H02P 9/105* (2013.01);
(Continued)

(58) Field of Classification Search
CPC ........ F03D 7/028; F03D 7/0224; H02P 9/105; H02P 2101/15; F05B 2270/1033; F05B 2270/327; F05B 2270/335
See application file for complete search history.

(56) References Cited

U.S. PATENT DOCUMENTS

| 8,866,323 B2 | 10/2014 | Nielsen |
| 10,418,925 B2 | 9/2019 | Tarnowski |

(Continued)

FOREIGN PATENT DOCUMENTS

| CN | 102472250 A | 5/2012 |
| CN | 103527407 A | 1/2014 |

(Continued)

OTHER PUBLICATIONS

International Search Report & Written Opinion dated Jun. 9, 2020 for PCT/EP2020/056190.

(Continued)

*Primary Examiner* — Viet P Nguyen
(74) *Attorney, Agent, or Firm* — Schmeiser, Olsen & Watts LLP (57) ABSTRACT

It is described a method of estimating additional power output for inertial response that will be available for output throughout a preset inertial response time interval, the method including: obtaining current values of at least a rotational speed of a wind turbine rotor and a power output of the wind turbine; deriving the additional power output based on the obtained current values and a remaining time interval of the preset inertial response time interval, in particular such that the additional power is available for output during the entire predetermined time interval.

14 Claims, 3 Drawing Sheets

(52) U.S. Cl.
CPC . *F05B 2270/1033* (2013.01); *F05B 2270/327* (2013.01); *F05B 2270/335* (2013.01); *H02P 2101/15* (2015.01)

(56) References Cited

U.S. PATENT DOCUMENTS

| | | |
|---|---|---|
| 10,731,632 B2 | 8/2020 | Hovgaard |
| 2016/0160839 A1 | 6/2016 | Wang et al. |
| 2018/0266392 A1 | 9/2018 | Hovgaard et al. |
| 2021/0180563 A1* | 6/2021 | Odgaard ................ F03D 7/028 |

FOREIGN PATENT DOCUMENTS

| | | |
|---|---|---|
| CN | 105134485 A | 12/2015 |
| CN | 105591395 A | 5/2016 |
| CN | 108350862 A | 7/2018 |
| EP | 3456958 A1 | 3/2019 |
| WO | 2011023588 A2 | 3/2011 |

OTHER PUBLICATIONS

El Itani S et al: "Short-term frequency support utilizing inertial response of DFIG wind turbines", Power and Energy Society General Meeting, 2011 IEEE, IEEE, Jul. 24, 2011 (Jul. 24, 2011), pp. 1-8, XP032171587, DOI: 10.1109/PES.2011.6038914 ISBN: 978-1-4577-1000-1 the whole document.
European Search Report and Written Opinion of the European Searching Authority issued Sep. 18, 2019 for Application No. 19164651.2.

* cited by examiner

ESTIMATING OF INERTIAL RESPONSE POWER OF A WIND TURBINE

CROSS-REFERENCE TO RELATED APPLICATIONS

This application claims priority to PCT Application No. PCT/EP2020/056190, having a filing date of Mar. 9, 2020, which claims priority to EP Application No. 19164651.2, having a filing date of Mar. 22, 2019, the entire contents both of which are hereby incorporated by reference.

FIELD OF TECHNOLOGY

The following relates to a method and to an arrangement of estimating additional power output of wind turbine power output, in particular beyond a current value of the power output, for inertial response that will be available for output throughout a preset inertial response time interval. Further, the following relates to a wind turbine comprising the arrangement and being adapted to perform the method.

BACKGROUND

Conventionally, a wind turbine provides electrical power to a utility grid to which plural consumers are connected. In case of electrical disturbances in the grid, in particular decrease of the frequency of the AC power in the grid due to an imbalance of power available within the utility grid and power consumed by the consumer, a so-called "inertial response" of the wind turbine or an entire wind park may be required and may for example be requested by an operator of the utility grid. In this inertial response, the wind park or an individual wind turbine may be required to deliver more power than previously supplied to the utility grid or more power than a nominal power.

In particular, when performing an inertial response at the wind turbine, the wind turbine may be required to deliver a particular amount of additional power for a particular time interval. The additional power may be taken from rotational energy stored within the rotor of the wind turbine. When delivering the additional power for a particular time interval, the rotational speed of the rotor may in most cases decrease. In other cases (e.g., high wind or curtailed power operation) pitching may prevent or diminish a drop in rotor speed. When the rotational speed of the rotor is decreased, the wind turbine may not be capable any more to supply the required particular amount of additional power. If the electrical capacity (of the wind turbine) does not allow the required power to be delivered to the grid, the duration of the response may be of priority. This is, the required additional power cannot be delivered in the total amount required. The problem is to estimate the maximum additional power that can be delivered for a particular number of seconds, in order to be able to deliver a constant power during the inertial response.

Conventionally, the maximum additional power may have been determined as a difference from the maximum power which is available at a given rotational speed and the current power supplied to the utility grid. However, this solution has been observed to be troublesome, as the rotor speed decreases as soon as the estimated additional power is delivered. This conventionally results in a limited response due to the maximum power curve.

Further, conventionally, a feature called "kinetic drop estimator" may have been developed to compensate the estimate, in case of lower/higher acceleration of rotor speed than expected. However, this also results in a response with a high additional power in the beginning of the inertial response, but decreasing power during the inertial response, as the power is limited by the electrical capacity of the wind turbine. The kinetic drop estimator may be very sensitive due to the use of rotor acceleration derived from measured rotor speed and may make the inertial response much less deterministic.

Thus, there may be a need for a method and an arrangement for estimating additional power output of a wind turbine for inertial response that will be available for output through a preset inertial response time interval, wherein reliability and accuracy is improved.

SUMMARY

According to an embodiment of the present invention it is provided a method of estimating (in particular maximum) additional power output (of wind turbine power output, in particular beyond a current value of the power output) for inertial response that will be available for output throughout a preset inertial response time interval, the method comprising: obtaining current values of at least a rotational speed of a wind turbine rotor and a power output of the wind turbine; deriving the additional power output based on the obtained current values and a remaining time interval (in particular being a difference between a current point in time and an end point in time of the inertial response) of the preset inertial response time interval, in particular such that the additional power is available for output during the entire predetermined inertial response time interval.

The additional power output may in particular be an additional active power output of the wind turbine. The additional power output may be the maximum active power that may be output by the wind turbine above or beyond the currently output active power over the entire preset inertial response time interval. The additional power output may be estimated such that the estimated additional power output can in fact be output during the preset inertial response time interval.

The preset inertial response time interval may be set for example by a utility grid operator or by a wind farm operator or on park level or on turbine level. The preset inertial response time interval may for example range between one second and several minutes, in particular between 5 seconds and 5 minutes, further in particular between 5 seconds and 20 seconds.

The inertial response may relate to an operation of the wind turbine during which additional (e.g., active) power output is provided to the utility grid. The inertial response may for example be requested from a utility grid operator or a wind turbine operator or controller. The inertial response may for example be initiated or requested in case of a frequency drop in the utility grid.

When for example the amount of produced power which is supplied to the utility grid is less than the power consumed by the consumers, the frequency of the AC power within the utility grid may decrease. In this case, it may be required for the wind turbine to supply additional power output to the utility grid, in order to restore the balance between produced power and consumed power and thus restore the nominal frequency (for example 50 Hz or 60 Hz) of the utility grid.

The method may be applied to a single wind turbine or may for example be applied in parallel to plural wind turbines of a wind park.

The current values of the rotational speed of the wind turbine rotor and the power output of the wind turbine may relate to the values as actually be measured or derived and which may continuously be updated. The rotational speed of the wind turbine rotor may relate to the electrical rotational speed or the mechanical rotational speed of the wind turbine rotor.

The power output of the wind turbine may in particular relate to the active power output of the wind turbine which may for example be determined by measuring electrical quantities, such as voltage and current at the output terminal of the wind turbine. The wind turbine may in particular include a permanent magnet synchronous machine as a generator which is coupled to the rotor at which plural rotor blades are connected. Further, to output terminals of the generator, a converter, in particular including an AC-DC portion, a DC link and a DC-AC portion may be connected which is capable of converting the variable frequency AC power stream to a substantially fixed frequency AC power stream. Further, downstream the converter, a wind turbine transformer may be provided for transforming the output power stream to a higher voltage.

The method may be started (immediately) before starting the inertial response and may continue throughout the inertial response time duration, i.e., throughout the preset inertial response time interval. The method may e.g., run all the time during operation of the wind turbine. The inertial response may for example be started at a start point in time of the inertial response and may be terminated at an end point in time of the inertial response. The remaining time interval may be the difference between the end point in time of the inertial response and a current point in time (in particular after the inertial response has been started). Thus, the method may continuously and repeatedly derive the additional power output based on the continuously updated current values and the continuously updated remaining time interval. Thereby, changes in external or environmental conditions may be accounted for, in particular for improving reliability and/or accuracy of the derived additional power output.

In particular, the method is designed to derive the additional power output such that the derived additional power output is in fact available for output to the utility grid during the entire predetermined inertial response time interval. Thus, ideally, the additional power in fact output during the entire predetermined inertial response time interval is not required to vary more than 10%, in particular more than 5%, thus may essentially be constant. Thereby, stabilizing the electrical properties of the utility grid may in an improved manner be achieved.

According to an embodiment of the present invention, the method uses as the current values at the beginning prior-values corresponding to an operational state prior to or at initiation of the inertial response and uses as the remaining time interval the preset inertial response time interval.

The prior-value of the power output may relate to the prior-value of the active power output of the wind turbine which may in particular be lower than a maximum power which can be output by the wind turbine according to a power curve relating the rotational speed and the maximum power. Furthermore, the prior-value of the rotational speed may be above a lower limit of the rotational speed. The operational state may be defined at least by the value of the rotational speed and the value of the power output. Further, other operational parameters, such as pitch angle and so forth, may be included.

According to an embodiment of the present invention, the current values and the remaining time interval are updated throughout the preset inertial response time interval and the additional power output is repeatedly derived based on the updated values.

The current values of the rotational speed and/or the power output may vary due to changes in the environmental conditions, such as changes in wind speed, but also due to the additionally output power. The remaining time interval may continuously decrease while performing the method.

The estimated additional power output may be communicated to a wind park controller and in particular also to a utility grid operator. When the utility grid operator receives the information regarding additional power output by plural wind turbines, the utility grid operator may distribute different power references to the wind turbines in dependence of the estimated additional power output for all the wind turbines of the wind park. Thereby, a stabilizing action to stabilize electrical properties of the utility grid may be improved.

Furthermore, when the additional power output is repeatedly and continuously derived and communicated to the utility grid operator, the utility grid may in turn supply continuously and repeatedly (new or updated) power references to the wind turbines for reliably supporting the utility grid.

According to an embodiment of the present invention, deriving the additional power is further based on a prior-value of a wind speed, in particular used throughout the preset inertial response time interval, and/or a continuously updated current value of the wind speed, wherein the prior-value of a wind speed is in particular estimated from the prior-values of the power output and the rotational speed.

When also the prior-value of the wind speed is considered, it is enabled to set a blade pitch angle to a power optimal value for even further allowing to increase the power output of the wind turbine. According to an embodiment of the present invention it is assumed that the wind speed does not change during the entire preset inertial response time interval. In this case, the prior-value of the wind speed may be utilized throughout performing the method. In other embodiments, the value of the wind speed may continuously be derived and considered, thereby also taking into account possibly changing wind conditions.

The value of the wind speed may according to embodiments of the present invention be estimated from the power output and the rotational speed or in still other embodiments may be measured using one or more anemometers installed at the respective wind turbine or at a mast close or remote to the wind turbine.

According to an embodiment of the present invention, deriving the additional power output is further based on a relationship of a power optimal value of a pitch angle depending on values of rotational speed and power output.

The power optimal value of a pitch angle may be a particular value of the pitch angle for which power output at the present environmental conditions (including wind speed, rotational speed) may be maximal. In particular, prior to initiation of the inertial response, the pitch angle may not be adjusted to the power optimal value of the pitch angle, for example because the nominal power has already been reached and/or also the nominal rotational speed has already been reached. Furthermore, the nominal wind speed may have been reached. If for example the wind speed is larger than the nominal wind speed and the wind turbine may be operated such that the power output is at the nominal power output (e.g., below maximum power) and the rotational speed is at the nominal rotational speed. In this case, the pitch angle may, with increasing wind speed, continuously be increased towards the feather position in order to maintain rotational speed and power output at the respective nominal values. In this situation, when the inertial response is required to be activated, the wind turbine may be adjusted to the power optimized pitch angle for still increasing the power output beyond the nominal power output.

According to an embodiment of the present invention, deriving the additional power output includes solving an optimization problem in which a post-value of the rotational speed is an optimization variable, wherein the post-value of the rotational speed is determined such that the additional power output is maximized, wherein in particular the simplex method is used for solving the optimization problem.

The optimization problem may in particular be a non-linear optimization problem. Other methods of solving the linear optimization problem may be applied.

In the optimization problem, the additional power output may be maximized which may require to find the particular post-value of the rotational speed. Thus, the post-value of the rotational speed may not be a pre-given quantity but may be found or determined when performing the method. The post-value of the rotational speed may be the rotational speed which is reached after terminating the inertial response, i.e., after the preset inertial response time interval has elapsed after the start point in time of the inertial response. Thus, the post-value of the rotational speed may be the value of the rotational speed as present at or after the end point in time of the inertial response.

The simplex algorithm or simplex method is a conventional algorithm for linear programming. In particular the downhill simplex method for non-linear optimization, also known as Nelder-Mead method, may be applied. During the method or in the method, simplicial cones are utilized and these become proper simplices with an additional constraint. The simplicial cones are the corners (i.e., the neighbourhoods of the vertices) of a geometrical object called a polytope. The shape of this polytope may be defined by constraints applied to an objective function. A system of linear inequalities defines a polytope as a feasible region. The simplex algorithm may begin at a starting vertex and may move along the edges of the polytope until it reaches the vertex of the optimal solution. By employing the simplex method, a simple implementation may be provided. According to an embodiment the available additional power is maximized, with the post-rotor speed as the free variable. It is subject to the following constraints: Pre-power+estimated additional power should be less than or equal to the maximum power envelope at post-speed The power at post-speed and optimal pitch should be larger than pre-power max allowed dip Post-speed should be greater than minimum limit on rotor speed.

According to an embodiment of the present invention, at least one of the following constraints is satisfied: a value of the rotational speed is above a preset lower rotational speed limit, in particular throughout the method; a power decrease from the prior-value of the power output to a post-value of the power output after the inertial response is above a preset power decrease limit; a preset power curve specifies a maximum power output dependent on the rotational speed.

The preset lower rotational speed limit may have been set by the wind park operator or utility grid operator. If the value of the rotational speed is above the preset lower rotational speed limit (in particular throughout the method), re-acceleration of the rotor may be performed to reach the nominal rotational speed in a reasonable short time interval. If the power decrease is above a preset power decrease limit, also the restoration of the power output to the nominal power output may be accelerated.

A minimum power limit may also be used in the optimization to predict an additional power such that the additional power can be delivered without violating this minimum power limit. When the turbine reaches this power limit during recovery it may maintain to output the minimum power limit until rotor speed is restored or decrease further in power if the rotor speed decreases below some limit, which is relative to the rotor speed, when it reached the minimum power limit.

The preset power curve may be a relationship between rotational speed and maximum power output, in particular maximum active power output of the wind turbine. The maximum power output may relate to the power output which is maximally suppliable to the utility grid depending on the rotational speed.

If these constraints are satisfied individually or in any combination, restoring nominal operational behaviour of the wind turbine after the inertial response may be simplified.

According to an embodiment of the present invention, the derived additional power output is less than a difference between a maximum power output, in particular according to the preset power curve, for the prior-value of the rotational speed and the prior-value of the power output.

Conventionally, the power output may have been increased from the prior-value of the power output to the maximal possible power output, i.e., to the power output on the preset power curve for the prior-value of the rotational speed. In contrast, according to this embodiment of the present invention, the derived additional power output is smaller than the difference between the maximum power output for the post-value of the rotational speed and the prior-value of the power output. Thereby, it is enabled to supply this derived additional power output without considerable changes to the utility grid during the entire preset inertial response time interval. In the conventional method, the additional power output changed, in particular considerably dropped during the preset inertial response time interval. When the additional power actually output is substantially constant, the control for stabilizing the grid may be more effective and/or simplified.

According to an embodiment of the present invention, for deriving the additional power output at least one, in particular all, of the following is considered: a rotor deceleration related power gain, in particular depending on a difference between a square of the current value of the rotational speed and a square of the post-value of the rotational speed; a pitch optimization related power gain, in particular obtained as a difference between power output at optimal pitch angle, in particular the pitch angle set to optimize power output for the current value of (power output and) rotational speed, and the prior-value of power output; a rotor efficiency related power loss, in particular obtained as half of a difference between the prior-value of the power output and the post-value of the power output after the inertial response that can be output at the post-value of the rotational speed without losing rotational speed.

The rotor deceleration related power gain may be determined as the difference between the rotational energy currently within the rotor and the rotational energy after termination of the inertial response, wherein this difference may be divided by two times the preset inertial response time interval. Thus, the rotor deceleration related power gain may be related to energy conservation.

The pitch optimization related power gain may be considered in particular, if also the pitch angle of the rotor blades is adjusted during the method. When the pitch angle is set to a power optimal value depending on the current operational conditions, further power can be gained for increasing the amount of additional power output.

The rotor efficiency related power loss may be related to a compensation to handle the change in the rotor efficiency as the rotor speed drops. The aim of the rotor efficiency compensation may be to compensate for the reduced efficiency of the rotor at lower rotor speed, given constant wind speed. Thereby, the prior-value of the power output is the power output before the inertial response is initiated (the power the rotor is able to produce at the speed before the inertial response without losing rotational speed). The post-value of the power is the power the rotor is able to produce at the post-value of the rotational speed without losing speed (for example looked up in a look-up table based on the post-value of the rotational speed, the wind speed, in particular prior-value of the wind speed and the optimal pitch angle). Going from the prior-value of the rotational speed to the post-value of the rotational speed takes the preset inertial response time interval. The energy loss is then approximated by half of the energy balance between these two rotor speeds. The approximation assumes that the rotor speed decreases by a constant rotor speed decrease rate during the inertial response, i.e., during the preset inertial response time interval. Thereby, the efficiency change may be accounted for in a simple manner.

According to an embodiment of the present invention, the additional power output is obtained as a sum of the rotor deceleration related power gain and the pitch optimization related power gain decreased by the rotor efficiency related power loss. Thereby, most important factors for deriving the additional power output may be considered in a simple combination.

According to an embodiment of the present invention, during the preset inertial response time interval the pitch angle is changed, in particular optimized regarding power output for the respective current values of power output and rotational speed. When the pitch angle is changed, the power which can additionally be output may still further be increased. In another embodiments, the pitch angle is kept at a fixed (e.g., power optimal) value.

According to an embodiment of the present invention, it is provided a method of controlling a wind park comprising plural wind turbines during an inertial response, the method comprising:

performing a method according to one of the preceding embodiments for at least one wind turbine of the plural wind turbines; controlling at least one wind turbine based on the estimated additional power output, in particular used as upper limit to an actually output power.

When the additional power output is estimated for one or for all of the wind turbines, the respective wind turbines may be controlled individually with different power references, while it is ensured that the respective wind turbines are actually able to provide the estimated additional power output. Thereby, stabilizing a utility grid may be improved.

The method may further comprise distributing different power references to the wind turbines, the power references being dependent on the estimated additional power outputs of all wind turbines such that the sum of the power references are constant throughout the preset inertial response time interval to be a preset total power value.

The preset total power value may be derived for example by a utility grid operator and calculated such that grid stabilization may be achieved when the preset total power value is actually supplied to the utility grid. Different wind turbines may provide according to the different power references different additional power output according to the estimated respective power output.

It should be understood, that features, individually or in any combination, disclosed, described or applied to a method of estimating additional power output for inertial response may also be applied, individually or in any combination, to an arrangement for estimating additional power output for inertial response according to embodiments of the present invention and vice versa.

According to an embodiment of the present invention it is provided an arrangement for estimating (in particular maximum) additional power output (of wind turbine power output) for inertial response that will be available for output throughout a preset inertial response time interval, the arrangement comprising: an input module adapted to obtain current values of at least a rotational speed of a wind turbine rotor and a power output of the wind turbine; a processor adapted to derive the additional power output based on the obtained current values and a remaining time interval of the preset inertial response time interval, in particular such that the additional power is available for output during the entire predetermined time interval.

Furthermore, according to an embodiment, it is provided a wind turbine, comprising: a rotor having plural rotor blades mounted thereon, the rotor blade being adjustable regarding pitch angle; a generator coupled with the rotor; and an arrangement according to the preceding embodiment.

Furthermore, a wind park is provided comprising plural wind turbines as defined in the preceding embodiment.

The aspects defined above and further aspects of embodiments of the present invention are apparent from the examples of embodiment to be described hereinafter and are explained with reference to the examples of embodiment. The invention will be described in more detail hereinafter with reference to examples of embodiment but to which embodiments of the invention are not limited.

BRIEF DESCRIPTION

Some of the embodiments will be described in detail, with references to the following Figures, wherein like designations denote like members, wherein.

DETAILED DESCRIPTION

Figure 1:
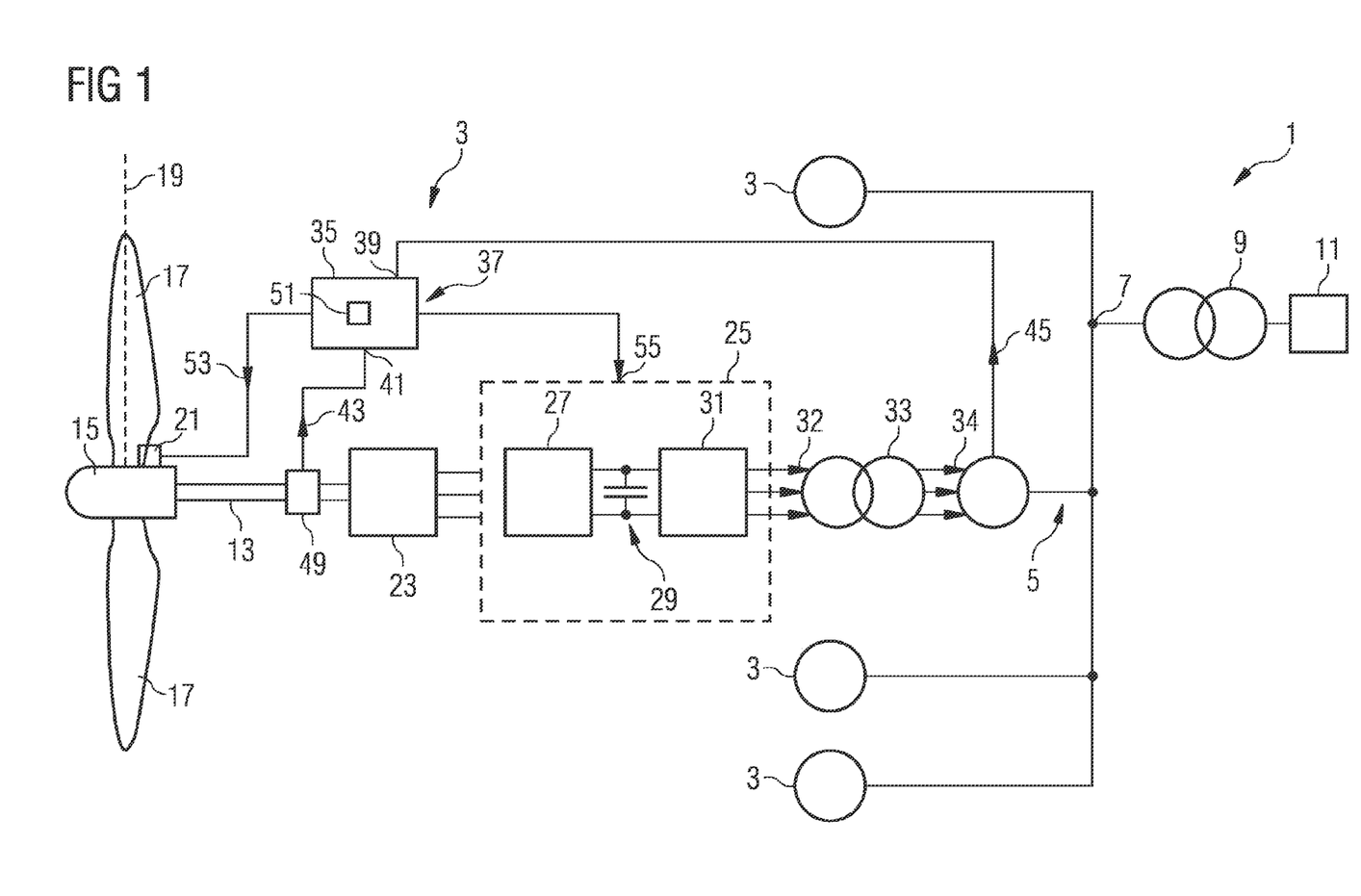
FIG. 1 schematically illustrates a wind park comprising a wind turbine according to an embodiment of the present invention including an arrangement for estimating additional power output according to an embodiment of the present invention.

The wind park 1 schematically illustrated in FIG. 1 comprises plural wind turbines 3 which are connected at their output terminals 5 to a point of common coupling 7 which is connected (in particular via a wind park transformer 9) to a utility grid 11. The wind turbine 3 comprises a rotor 13 at which a hub 15 is mounted to which hub plural rotor blades 17 are mounted. The rotor blades 17 are configured to be adjustable regarding a pitch angle, i.e., an adjustment angle of a rotation around a pitch angle axis 19. Thereby, a pitch adjustment system 21 is provided which comprises respective actuators for turning the blades 17 around the longitudinal axis 19 for adjusting a particular pitch angle.

The wind turbine 3 further comprises a generator 23 which is coupled to the rotor 13. Three-phase output terminals of the generator 23 are coupled to a converter 25 comprising a AC-DC portion 27, a DC link 29 and a DC-AC portion 31 and configured for converting the variable frequency AC power stream to a substantially fixed frequency power stream 32. The fixed frequency power stream 32 is supplied to a wind turbine transformer 33 which transforms the power stream to a higher voltage and supplies it as power stream 34 to the point of common coupling 7.

The wind turbine 3 further comprises an arrangement 35 according to an embodiment of the present invention for estimating additional power output of the wind turbine for an inertial response. The arrangement 35 comprises an input module 37 including input terminals 39 and 41 for receiving current values of at least a rotational speed 43 and a power output 45 of the wind turbine 3.

Thereby, the power output is represented by the measurement signal 45 as derived by a measurement module 47 which is connected to the output terminal of the transformer 33 and is capable of measuring the voltage and/or current of the output power stream 34.

The value of the rotational speed is represented by a measurement signal 43 as obtained by a rotational speed sensor 49 which measures the rotational speed of the rotor 13.

The arrangement 35 comprises a processor 51 which is adapted to derive the additional power output based on the obtained current values 43, 45 of the rotational speed and the power output and a remaining time interval of a preset inertial response time interval such that the additional power is available for output during the entire predetermined time interval.

During the inertial response, the arrangement 35 (which may for example be comprised in a wind turbine controller (in particular incremented in software and/or hardware)) may supply control signals 53, 55 to the pitch adjustment system 21 and the converter 25, respectively, in order to control these components for actually enabling to output the additional power output as the power stream 34 on top of the previously output power output.

Figure 2:
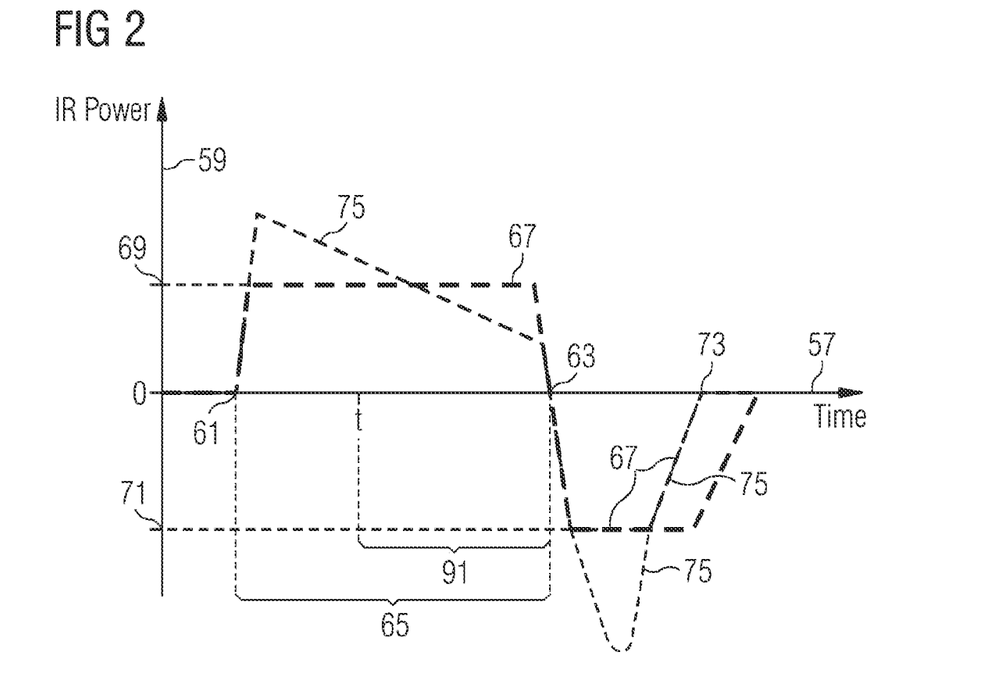
FIG. 2 illustrates curves for explaining embodiments of the present invention.

FIG. 2 illustrates a graph having an abscissa 57 indicating the time and having an ordinate 59 indicating the additional power output, i.e., the active power output that is additionally to the prior-value of the power output (before the inertial response) output by the wind turbine 3 illustrated in FIG. 1. The inertial response starts at a start point 61 in time and ends at an end point in time 63 of the inertial response. The difference between the end point in time 63 and the start point in time 61 of the inertial response corresponds to the preset inertial response time interval 65 (also referred to as Δt) as is illustrated in FIG. 2.

The curve 67 indicates the additional power output as output by the wind turbine 3 illustrated in FIG. 1 according to an embodiment of the present invention. As can be appreciated from FIG. 2, beyond the start point in time 61 of the inertial response, the additional power 67 sharply increased to be above zero, i.e., the wind turbine 3 outputs active power which is larger than the prior-value of the output power prior to the inertial response and thus prior to the start point in time 61. The additional output power 67 is substantially constant during the preset inertial response time interval 65. In particular, it rapidly increases from zero at the start point in time 61 and reaches the value 69 rapidly. From the value 69, the additional output power 67 quickly drops to zero at the end point in time 63 of the inertial response.

After the inertial response, the additional power is negative reaching a value 71 (representing a preset power decrease limit) which lasts until the point in time 73 at which the additional power is zero again, i.e., the wind turbine outputs the same amount of power as has been output prior to the inertial response. Thus, the drop (from the prior value) of the power output after the inertial response according to curve 67 is above or equal to the preset power decrease limit 71. The curve 67 in FIG. 2 is obtained according to a method of estimating additional power output 69 according to an embodiment of the present invention which method the arrangement 35 is adapted to carry out.

FIG. 2 also illustrates a curve 75 of an additional power output according to a conventional method. As can be seen, the power output 75 decreases during the preset inertial response time interval making it more difficult to appropriately control or to appropriately restore stability of the utility grid. Further, after the IR, i.e., after time point 63, the drop of power according to conventional curve 75 falls below the preset power decrease limit 71, e.g., until the nominal rotational speed is recovered.

Figure 3:
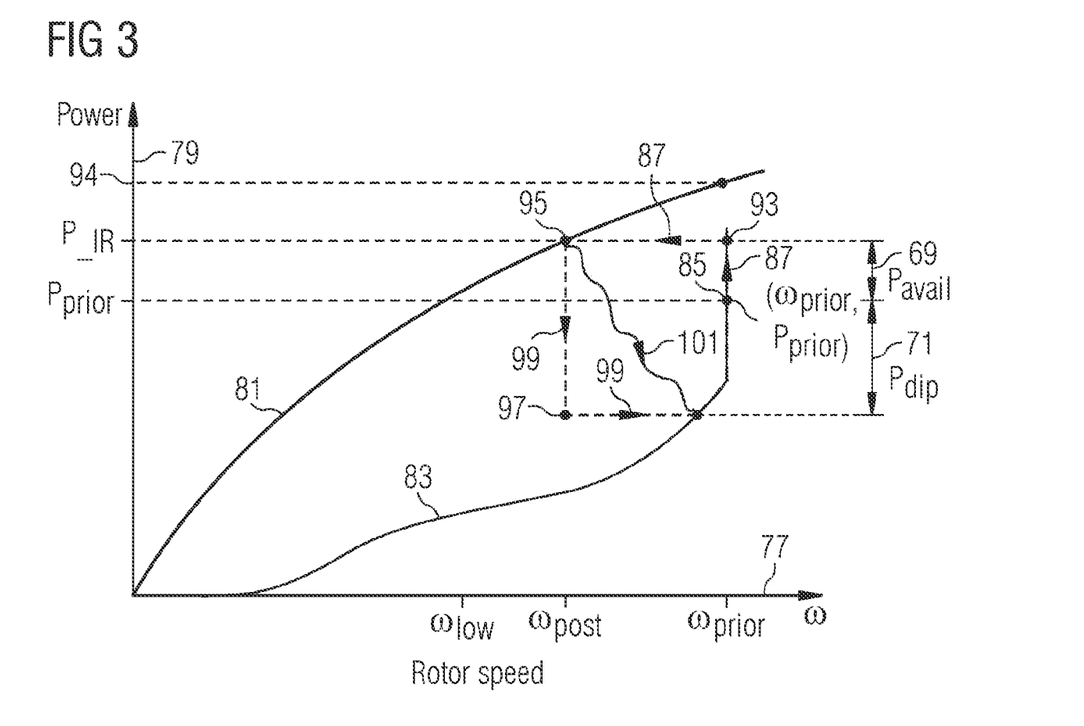
FIG. 3 illustrates curves for explaining embodiments of the present invention.

FIG. 3 illustrates curves as considered in embodiments according to the present invention, wherein an abscissa 77 indicates the rotational speed w of the rotor 13 and the ordinate 79 indicates the total power output of the wind turbine 3.

The curve 81 indicates a preset power curve defining a maximum power output dependent on the rotational speed ω. The curve 83 indicates a speed-power trajectory according to a normal operation of the wind turbine.

The point 85 (ωprior, Pprior) indicates the working point of the wind turbine 3 prior to the inertial response, i.e., where the rotational speed and the power output have prior-values. According to an embodiment of the present invention, a trajectory 87 is traversed during inertial response, i.e., during the preset inertial response time interval 65 as illustrated in FIG. 2 according to the curve 67. In particular, taking into account the prior-values of rotational speed and power output, i.e., point 85 in FIG. 3, the additional power output 69 is derived based on the obtained current value of the rotational speed of the wind turbine rotor and the power output and a remaining time interval 91 as illustrated in FIG. 2. The remaining time interval 91 is the difference between the end point in time 63 of the inertial response and the current point in time t.

In a vertical portion of the trajectory 87 the power output is increased from Pprior to Pprior plus the additional power 69, to reach point 93, where the power P_IR is output. From the point 93 in FIG. 3, the trajectory 87 follows a horizontal path, i.e., a path having constant additional power output until the preset power curve 81 is hit. The preset power curve 81 is hit at a rotational speed wpost which had been determined such that the additional power output 69 is maximal.

After the trajectory 87 hits the preset power curve 81, the inertial response is completed at the end point in time 63 of the inertial response. Ideally, that is when the curve 81 is hit, i.e., at point 95. However, in reality it may either never reach it, or be limited by it for a short time due to over/under-estimation.

From then on, the power output decreases from P_IR to the point 97 corresponding to power output an amount of 71 below the prior-value Pprior of the power output. From point 97 on, the rotational speed is increased again until the horizontal hits the curve 83.

Thus, the wind turbine is controlled to reach, starting from the end of the inertial response at point 95, the point 85 via a trajectory 99. In other embodiments, a trajectory 101 is traversed for returning to normal operation again. For example, during the transition between 95 and 97 the rotor speed may change. So point 97 is not necessarily at wpost, but may have lower or higher rotational speed.

Embodiments of the present invention estimate the available inertial response power that can be constantly delivered during inertial response which is also referred to as $P_{avail}$. The estimated maximum available power $P_{avail}$ is based on rotor performance data table, i.e., power as a function of rotor speed, pitch angle and wind speed given by $P(\omega, v, \beta)$.

Thereby, current rotor speed $\omega$, optimal pitch curve, $\beta_{opt}$, Wind speed at IR activation time, $v_{pre}$, power at IR activation time, Pprior, duration of the inertial response, i.e., the time with additional power, $\Delta t$ (also referred to as preset inertial response time interval 65) are considered.

The above may be formulated according to an embodiment as an optimization problem subjected to the following constraints:
- maximum power curve (for example curve 81 in FIG. 3)
- lower limit on rotor speed, for example $\omega_{low}$ as indicated in FIG. 3
- maximum power dip after the inertial response, for example $P_{dip}$ in FIG. 3 or amount 71 in FIG. 2

The available inertial response power may be approximated by the amount of power that can be generated from a rotor deceleration and by pitching into the optimal pitch. This can be expressed by $$P_{avail}(\omega, \omega_{post}, \Delta t) = P_{RotExtract}(\omega, \omega_{post}, \Delta t) + P_{OptPitch}(\omega) - P_{EffComp}(\omega, \omega_{post})$$

Thereby, P_RotExtract is the power balance from a rotor deceleration $$P_{RotExtract} = \frac{J_{Rotor}}{2 \cdot \Delta t}(\omega^2 - \omega_{post}^2)$$

POptPitch is the power gained by pitching to the optimal pitch (e.g., obtained from a Cp power table)

$$P_{OptPitch} = P(\omega, v_{pre}, \beta_{opt}) - P_{pre}$$

PEffComp is a compensation to handle the change in rotor efficiency as the rotor speed drops.

The estimate (the available power or additional power output $P_{avail}$, reference sign 69) may be updated throughout the response estimating how much additional power that is available for the remaining time 91 of the response.

Embodiments of the present invention provide several advantages:
- provide a more deterministic IR
- maximize a constant power output during the IR
- provide a usable IR power estimate for park level control and customer use
- eliminate tuning
- enable the IR feature to be compliant with grid requirements
- deliver x kW additional power of y seconds
- power must not drop more than z kW during the recovery period (after overproduction)

Further features may contribute to the above-mentioned advantages:
- The estimated available IR power may be used as an upper limit to the actually provided additional power during the IR
- The estimate may be formulated as an optimization problem, maximizing the amount of additional power that can be delivered for the entire response
- As the estimate takes decrease of rotor speed and rotor efficiency into account, it may be precise enough to be used in a closed loop control on a park level and for reporting towards the customer
- The estimator may make use of rotor performance data from the APE, which eliminates the need of many tuning handles
- As the estimate may be used in the closed loop control, it enables the IR feature to deliver a constant power output for the entire duration of the response as required by the grid. It implements the $P_{dip}$ lower limit as a constraint in the optimization. The estimate is also used in park level control and reference distribution to turbulence enabling the park to provide an even better overall response.

Figure 4:
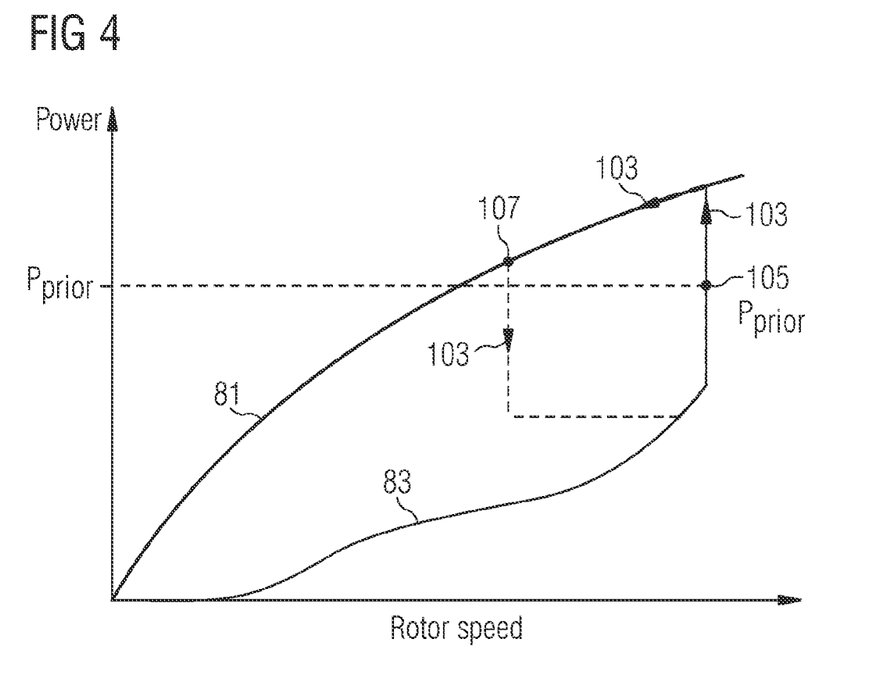
FIG. 4 illustrates curves according to the conventional art.

FIG. 4 illustrates a trajectory 103 as traversed according to a conventional method. The prior-value of the power output at point 105 is left and the power increases until the optimal power curve 81 is hit. Then, during the inertial response, the additional power output decreases (e.g., due to the decreasing rotor speed and the limitation enforced by the maximum power curve) (according to curve 75 in FIG. 2) along the trajectory 103 until the point 107 is reached. Thus, according to the conventional method, a constant additional power output cannot be supplied to the utility grid, complicating the stabilization of the utility grid.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for estimating additional power output for inertial response that will be available for output throughout a preset inertial response time interval, the method comprising:
   obtaining current values of at least a rotational speed of a wind turbine rotor and a power output of the wind turbine; and
   deriving the additional power output based on the obtained current values and a remaining time interval of the preset inertial response time interval, such that the additional power is available for output during an entire predetermined time interval;
   wherein the derived additional power output is less than a difference between a maximum power output, according to a preset power curve, for a post-value of the rotational speed and a prior-value of the power output, the preset power curve specifying a maximum power output dependent on the rotational speed, and the beginning prior-values corresponding to an operational state prior to or at initiation of the inertial response.

2. The method according to claim 1, wherein the method uses as the current values at the beginning prior-values, and uses as the remaining time interval the preset inertial response time interval.

3. The method according to claim 1, wherein the current values and the remaining time interval are updated throughout the preset inertial response time interval and the additional power output is repeatedly derived based on the updated values.

4. The method according to claim 1, wherein deriving the additional power is further based on a prior-value of a wind speed, used throughout the preset inertial response time interval, and/or a continuously updated current value of the wind speed, wherein the prior-value of a wind speed is estimated from the prior-values of the power output and the rotational speed.

5. The method according to claim 1, wherein deriving the additional power output is further based on a relationship of a power optimal value of a pitch angle depending on values of rotational speed and power output.

6. The method according to claim 1, wherein deriving the additional power output includes solving an optimization problem in which a post-value of the rotational speed is an optimization variable, wherein the post-value of the rotational speed is determined such that the additional power output is maximized.

7. The method according to claim 1, wherein at least one of the following constraints is satisfied:
a value of the rotational speed is above a preset lower rotational speed limit throughout the method;
a power decrease from the prior-value of the power output to a post-value of the power output after the inertial response is above or equal to a preset power decrease limit.

8. The method according to claim 1, wherein for deriving the additional power output at least one of the following is considered:
a rotor deceleration related power gain, depending on a difference between a square of the current value of the rotational speed and a square of the post-value of the rotational speed that occurs after the inertial response;
a pitch optimization related power gain, obtained as a difference between power output at optimal pitch angle set to optimize power output for the current value of rotational speed, and the prior-value of power output;
a rotor efficiency related power loss, obtained as half of a difference between the prior-value of the power output and the post-value of the power output after the inertial response that can be output at the post-value of the rotational speed without losing rotational speed.

9. The method according to claim 8, wherein the additional power output is obtained as a sum of the rotor deceleration related power gain and the pitch optimization related power gain decreased by the rotor efficiency related power loss.

10. The method according to claim 1, wherein during the preset inertial response time interval the pitch angle is optimized regarding power output for the respective current values of power output and rotational speed.

11. The method of controlling a wind park comprising plural wind turbines during an inertial response, the method comprising:
performing the method according to claim 1 for at least one wind turbine of the plural wind turbines;
controlling at least one wind turbine based on the estimated additional power output, used as upper limit to an actually output power.

12. The method according to claim 11, further comprising:
distributing different power references to the wind turbines, the power references being dependent on the estimated additional power outputs of all wind turbines such that the sum of the power references are constant throughout the preset inertial response time interval to be a preset total power value.

13. An arrangement for estimating additional power output for inertial response that will be available for output throughout a preset inertial response time interval, the arrangement comprising:
an input module configured to obtain current values of at least a rotational speed of a wind turbine rotor and a power output of the wind turbine;
a processor configured to derive the additional power output based on the obtained current values and a remaining time interval of the preset inertial response time interval, such that the additional power is available for output during the entire predetermined time interval;
wherein the derived additional power output is less than a difference between a maximum power output, according to a preset power curve, for a post-value of the rotational speed and a prior-value of the power output, the preset power curve specifying a maximum power output dependent on the rotational speed, and the beginning prior-values corresponding to an operational state prior to or at initiation of the inertial response.

14. A wind turbine, comprising:
a rotor comprising plural rotor blades mounted thereon, the rotor blade being adjustable regarding pitch angle;
a generator coupled with the rotor; and
the arrangement according to claim 13.

* * * * *